US006050753A

United States Patent [19]

Turner

[11] Patent Number: 6,050,753

[45] Date of Patent: Apr. 18, 2000

[54] APPARATUS FOR MOUNTING A DRILL ON A PIPE

[76] Inventor: Gordon Henry Turner, 15 Aylesham Way, Yateley, Hants GU46 6NR, United Kingdom

[21] Appl. No.: 09/284,729

[22] PCT Filed: Oct. 14, 1997

[86] PCT No.: PCT/GB97/02824

§ 371 Date: Jun. 14, 1999

§ 102(e) Date: Jun. 14, 1999

[87] PCT Pub. No.: WO98/16353

PCT Pub. Date: Apr. 23, 1998

[30] Foreign Application Priority Data

Oct. 15, 1996 [GB] United Kingdom .................. 9621472

[51] Int. Cl.[7] .................................................. B23B 45/14

[52] U.S. Cl. ............................... 408/88; 408/92; 408/712

[58] Field of Search ................................ 408/88, 91, 92, 408/712

[56] References Cited

U.S. PATENT DOCUMENTS

| | | | |
|---|---|---|---|
| 3,044,324 | 7/1962 | Buck | 408/712 |
| 3,762,829 | 10/1973 | Yilmaz | 408/105 |
| 3,922,107 | 11/1975 | Fowler | 408/67 |
| 4,094,612 | 6/1978 | Krieg | 408/92 |
| 4,936,720 | 6/1990 | Dolatowski et al. | 408/712 |
| 5,051,044 | 9/1991 | Allen | 408/92 |
| 5,713,702 | 2/1998 | Turner | 408/712 |

*Primary Examiner*—Steven C. Bishop

*Attorney, Agent, or Firm*—Gottlieb Rackman & Reisman PC

[57] ABSTRACT

Apparatus for mounting a drill on the pipe comprises a platform carrying a mounting member for a drill stand. The mounting may slide along a frame which carries a plurality of elongate holes therein. The longitudinal movement allowed by this relative sliding permits a drill mounted on a drill stand to be selectively positioned in order to bore a hole in a pipe upon which the platform is rigidly clamped. By provision of such a facility, there is no need to loosen the clamping force of the platform upon the pipe.

13 Claims, 4 Drawing Sheets

APPARATUS FOR MOUNTING A DRILL ON A PIPE

The present invention has particular, although not exclusive, relevance to an apparatus for mounting a drill on a pipe in environments where a magnetic mounting system would not be appropriate. Use of an apparatus to enable a drill to be held in a steady position whilst boring a hole into a pipe is considered advantageous. The use of such apparatus will enable a secondary branch pipe to be fitted and welded directly into the main pipe which has been bored. Such apparatus for holding a drill steady during a boring operation is of particular assistance when fitting a secondary pipe in situ.

It is known to provide a system for holding a drill steadily to a pipe to be bored by using magnetic attraction. Such systems would generally include an electromagnetic member which, when energised will hold a drill stand rigidly to a metallic pipe so that a drill mounted on the stand may bore a hole in a defined position on the pipe.

In certain circumstances, however, the use of such magnetically mounted systems is problematical. In environments which are particularly sensitive to electrical or magnetic fields, such as radar installations or computer factories, then this type of equipment cannot be used. Alternatively there may be situations in which the pipe to be bored comprises a non-magnetic material such as stainless steel, brass or clay.

Additionally, in the event of using a magnetically mounted drill for boring into a pipe, a separate safety chain is necessarily used because in the event of a power failure to the electromagnetic clamp, care needs to be taken to ensure that the entire apparatus does not fall and injure operators who may be standing underneath. U.S. Pat. No. 3,762,829 discloses a system for mounting a drill wherein the drill can be adjusted in two planes. The system allows the drill to pivot, having been adjusted, so that it may bore into the face of a solid shaft. Such a system, however, does not allow completely free adjustment of the drill and is also not arranged to permit the means which is mounted upon the shaft to be adjusted relative thereto with any ease.

U.S. Pat. No. 4,094,612 discloses an arrangement for fixing a drill stand in position whilst drilling into a pipe. The drill stand is magnetically mounted onto a ferromagnetic plate. The plate is secured to the pipe by a chain-whip clamping arrangement. The drill may only move in a direction radially toward or away from the pipe and still suffers the disadvantages associated with magnetic mounting—such as not being able to withstand large forces without becoming dislodged from the plate.

The aforementioned known types of mounting arrangements also tend to be relatively inflexible in their use. Once they are mounted on the pipe to be bored, then relative movement between the drill its mount and the pipe is not possible. Thus a very high degree of alignment between the drill and pipe must be obtained before firmly clamping the system in place. This tends to create an inflexible arrangement.

It is thus an object of the present invention to at least alleviate the aforementioned shortcomings and accordingly there is provided an apparatus for mounting a drill on a pipe, comprising:

a platform, means for clamping the platform (9) on a pipe (7) to be drilled, and means for mounting a drill press stand (143) on the platform (9), wherein the means for mounting the drill press stand on the platform allows the position of the drill press stand (9) to be adjusted relative to the platform characterised in that the relative adjustment between the drill press stand and the platform is in a direction parallel to the axis of the pipe (7) to be drilled, and wherein the pipe (7) may be drilled radially. By allowing the drill press stand to be adjusted relative to the platform, a more flexible arrangement is provided than has more hitherto been the case.

Preferably a means for clamping the platform on a pipe to be drilled comprises a backplate shaped to fit against the pipe, and means for attaching the platform to the backplate, with the pipe sandwiched therebetween. This arrangement is of particular benefit when being used in an environment such as sprinkler systems and high pressure pipe work which tends to be found on condensers in large ships. Because this type of pipe work has its own characteristics, the use of a backplate to sandwich the pipe between the backplate and the platform enables a rigid and solid clamping arrangement to be provided.

Alternatively, the means for clamping the platform on a pipe to be drilled may comprise a member, extendible from one portion of the platform to another portion of the platform and releasably connectable to both portions thereof, which member passes at least partway around the outer periphery of the pipe, thereby clamping the platform on the pipe. This form of mounting arrangement provides for a quick and easy clamping of the platform to the pipe. Preferably the surface of the platform may be arranged about a pipe to be drilled and is shaped to form a V-groove. This enables accurate alignment between the platform and the pipe. Alternatively the one and/or the other portions of the platform include means for adjusting the tension in the member this allows accurate control of the pressure applied to clamp the apparatus to the pipe, thereby ensuring no damage to the pipe occurs. Preferably the means for adjusting the tension comprises a screw-threaded detent. Preferably the member comprises a chain.

In a preferred embodiment of the present invention, the means for mounting the drill press stand on the platform comprises a pillar housing for receiving the pillar of the drill press stand. In this manner a drill press stand for carrying a drill may be readily mounted to the apparatus.

Advantageously the drill press stand may be mounted by bolts extending through elongate holes in the platform to allow the drill press stand to be slidably adjusted relative to the platform Alternatively a frame may be mounted on the platform, and the drill press stand located by bolts extending through elongate holes in the platform to allow the platform to be slidably adjusted along the frame. These alternative provisions help enable accurate alignment between the drill and that part of the pipe to be drilled.

The present invention will now be described, by way of example only, and with reference to the accompanying drawing of which FIG. 1 illustrates a perspective view of a backplate f or use with a first embodiment of the present invention;

Figure 1:
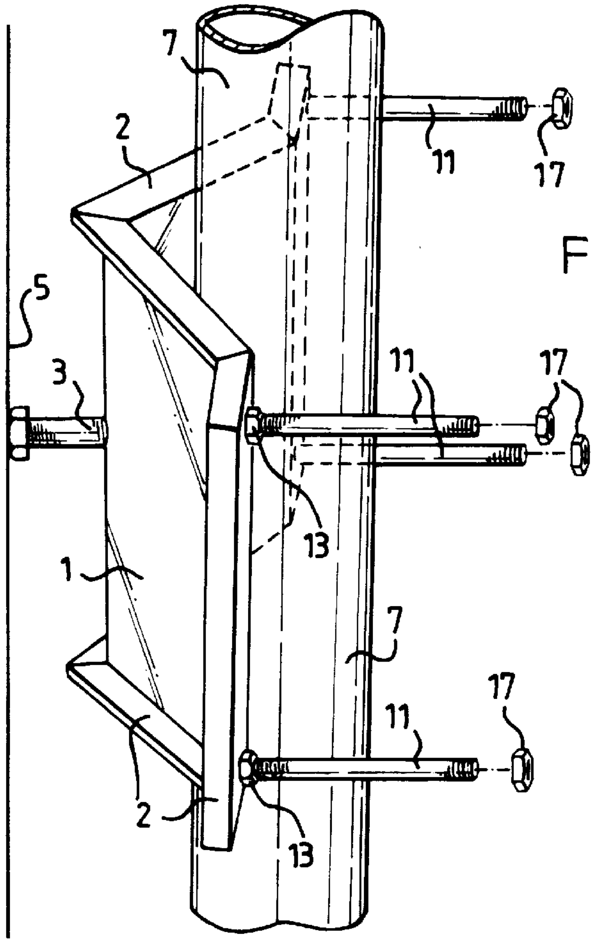

Referring firstly to FIGS. 1 to 4 which illustrate a first embodiment of the present invention, and particularly FIG. 1, it can be seen that a backplate 1 is arranged to fit around a pipe 7. The backplate 1 is formed to have two side flanges 2 which provide extra strength for the backplate 1. The backplate 1 is fitted around a pipe 7 and, in this example, there is little clearance between the pipe 7 and an adjacent wall or other surface 5. The backplate 2 has formed therein a hole which accepts a threaded screw 3. By adjusting the protrusion of the threaded screw 3 from the backplate 1, the backplate 1 may be held in contact with the pipe 7 due to the head of the screw 3 contacting the wall 5. This provides advantage in that it holds the backplate 1 steady until such times as the remainder of the apparatus may be brought into contact therewith and the pipe 7 clamped therebetween.

The backplate 1 has formed therein a plurality of holes through which may pass bolts 11. The bolts 11 are rigidly held in position in the backplate 1 by way of locking nuts 13. Although not shown in the drawing, there are provided four bolts 11 and eight locking nuts 13.

Figure 2:
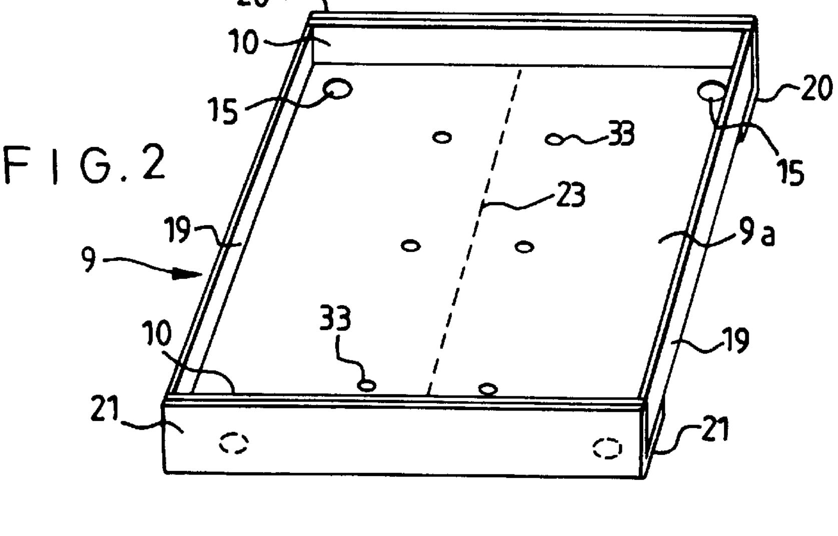
FIG. 2 shows a perspective view of a platform in accordance with this first embodiment of the present invention.

Referring now also to FIG. 2 it can be seen that a platform 9, formed of metal includes four holes 15 bored therein, through which the bolts 11 may pass. In this manner therefore the platform 9 may be coupled to the backplate 1 in order to sandwich the pipe 7 there between The platform is held onto the bolts 11 by way of tightening nuts 17.

It can be seen from FIG. 2 that the platform 9 includes side flanges 19 which are folded to provide extra strength to the platform 9. Furthermore steel angle pieces 20 and 21 provide yet more strength to prevent any tendency for platform 9 to be bent if the nuts 17 are overtightened. It will be seen that a hatched line 23 indicates the centre line of the pipe 7 when clamped between the backplate 1 and platform 9.

It will be apparent that the platform 9 only contacts the pipe 7 at each end where the angled pieces 20 and 21 are fitted. This prevents any possibility of the platform 9 contacting any uneven surfaces on the pipe 7 which could cause a platform 9 to rock along the centre line 23 of the pipe 7. The flanges 10 of platform 9 are folded along the top and bottom edges thereof before the steel angle pieces 20 and 21 are fitted. It will thus be appreciated that in the embodiment shown with reference to FIGS. 1 and 2 that the means for clamping the platform to the pipe 7 comprises a backplate 1 and the arrangement of the bolts 11 and nuts 13 and 17.

Figure 3:
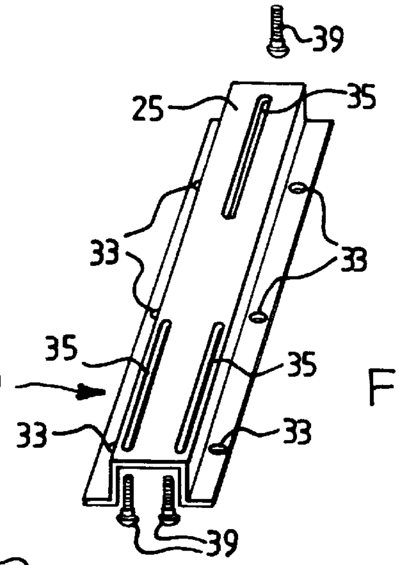
FIG. 3 shows a perspective view of a frame for use with the first embodiment of the present invention.

Referring now also to FIG. 3 it will be seen that a frame 25 is arranged to be mounted on the platform 9 by way of mounting holes 33 formed in the platform 9 and corresponding mounting holes 33 formed in the frame 25. Although not shown in the drawings it will be understood that bolts s through the holes 33 in order to rigidly clamp (via nuts) the frame 25 to the platform 9.

The frame 25 has formed therein a plurality of elongate holes 35. Through each of these holes passes a coach bolt 39, which coach bolts themselves mount into corresponding bolt holes 41 formed in a means for mounting a drill press stand, here casting 37 which can be seen from FIG. 4.

Figure 4:
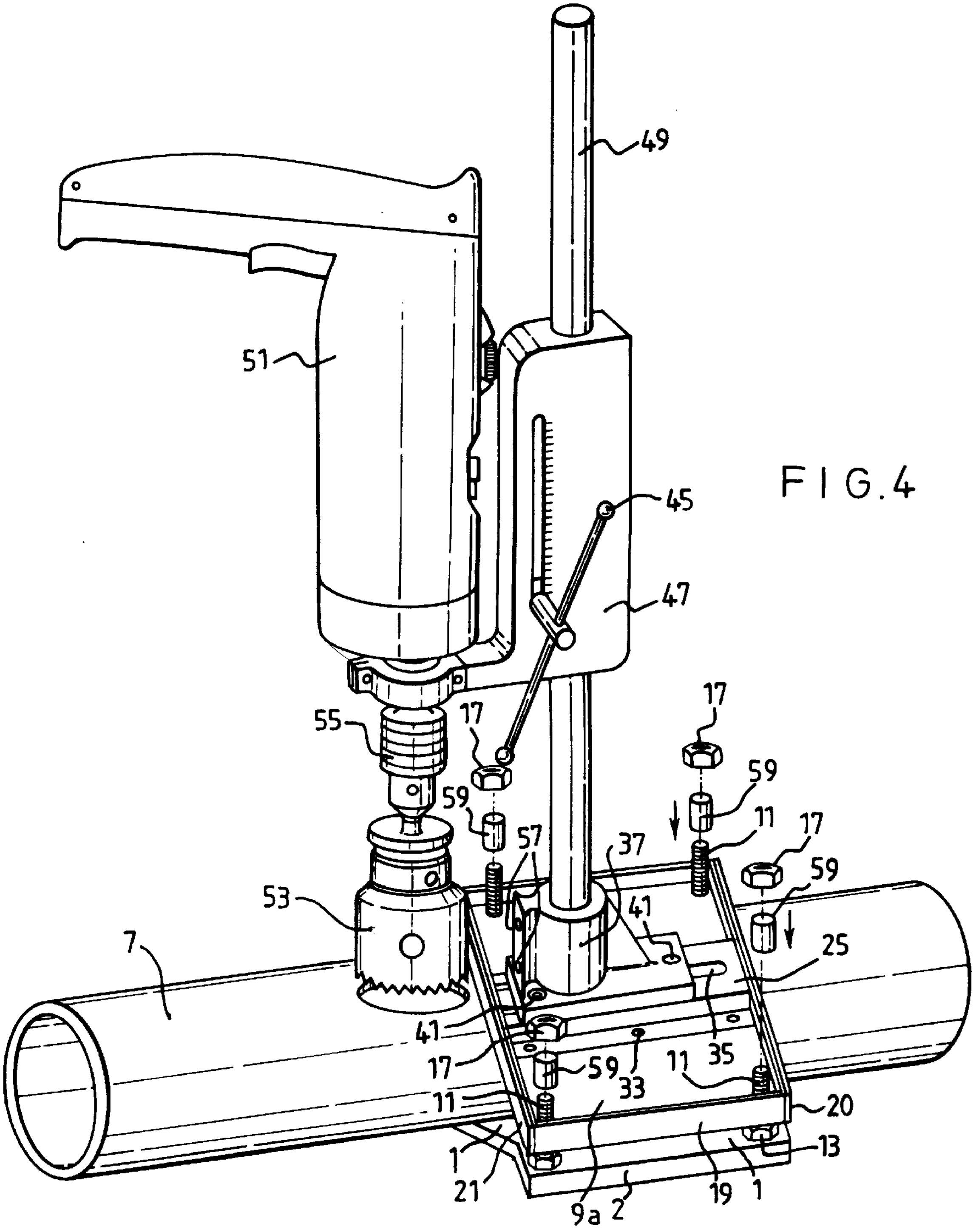
FIG. 4 shows a perspective view of the entire apparatus in accordance with the first aspect of the present invention including a drill press stand and drill operating on a pipe.

By selectively tightening or slackening the tension between each coach bolt 39 and the bolt hole 41, the casting 37 may be allowed to slide laterally from left to right as looking at FIG. 4 until such times as the tension is reapplied to rigidly clamp the casting 37 to the frame 25. Such adjustment is desirable in order to allow the accurate alignment of the drill to be used with the pipe 7, as will be described herebelow.

Referring now particularly to FIG. 4 it can be seen that the casting 37 has mounted therein a pillar 49 of a drill press stand 47. Drill press stands are known in the art and so will not be described in detail herein. Mounted on the drill press stand is a drill 51 including a chuck 55 and a borer 53 mounted in the chuck 55. It will be understood that by rotation of the drill press stand handle 45 the drill 51 may be advanced towards or away from the pipe 7. In this way therefore the borer 53 may be brought selectively into contact with the pipe 7.

The longitudinal relationship between the borer 53 and the platform 9 (which is rigidly clamped to the pipe 7 in FIG. 4) may be adjusted according to the discussion above with reference to FIG. 3. Particularly, therefore, by slackening the coach bolts 39 the longitudinal travel of the casting 37 via elongate holes 35 may be undertaken. This permits the longitudinal location of the borer 53 from the platform 9 along the centre line 23 to be selected by a user of the apparatus. This method of adjustment is also to allow the position of the hole being drilled to be situated as close to the platform 9 as possible. This is desirable so that the clamping force of the four bolts 11 is as near to the pressure point of the borer 53 as is possible. In FIG. 4 only two bolt holes 41, three holes 33 and a small part of backplate 1 are visible. A distance piece 59 and nut 17 are shown in exploded view. When not in use the whole assembly 45, 47, 49, 51, 53 and 55 may be removed from the casting 37 by slackening release screws 57 in the casting 37. Additionally bushes (not shown) may be supplied to suit different pillar sizes for different types of drill press stand.

Figure 5:
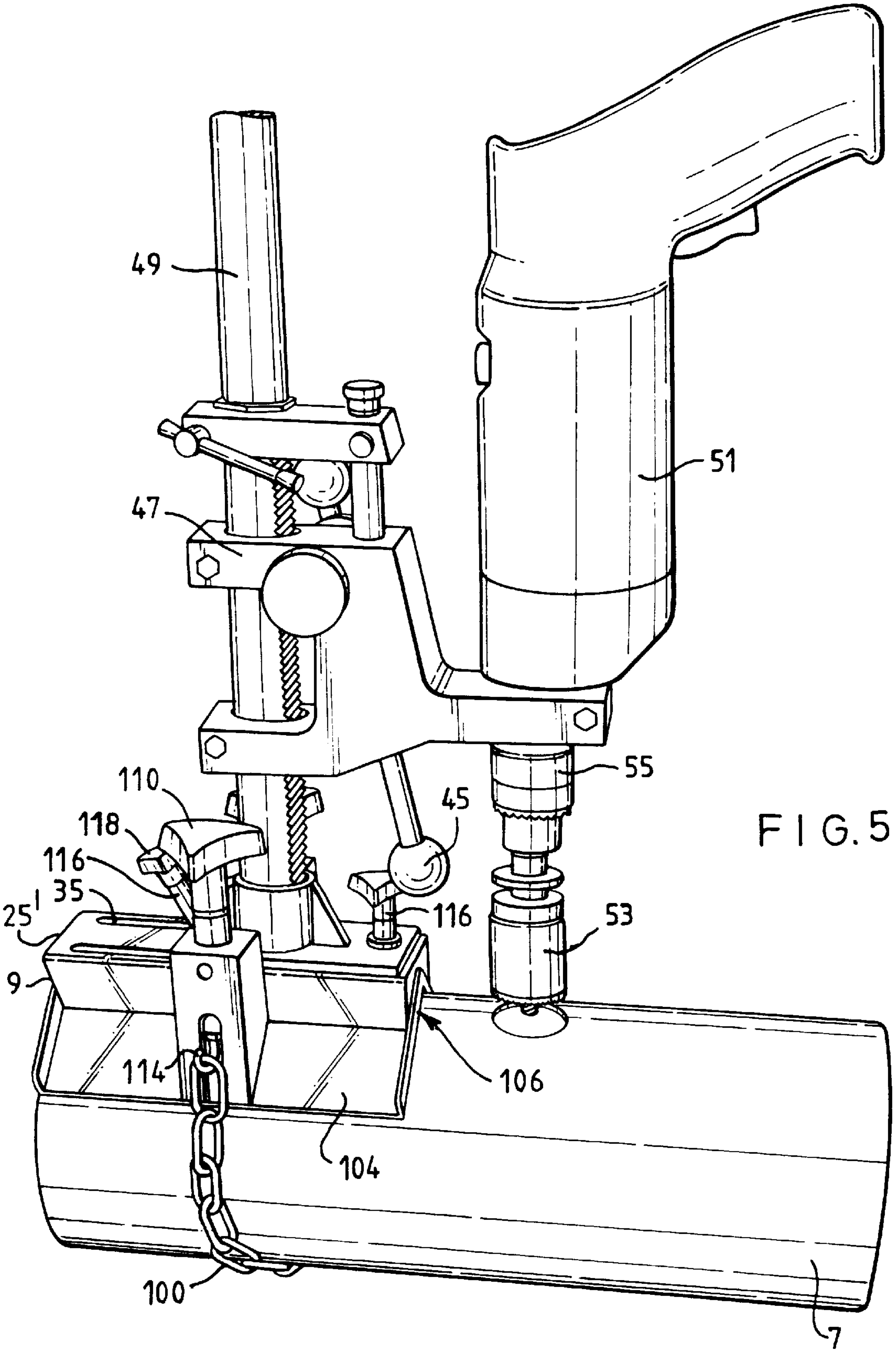
FIG. 5 shows a perspective view from above of an apparatus in accordance with a second aspect of the present invention.
Figure 6:
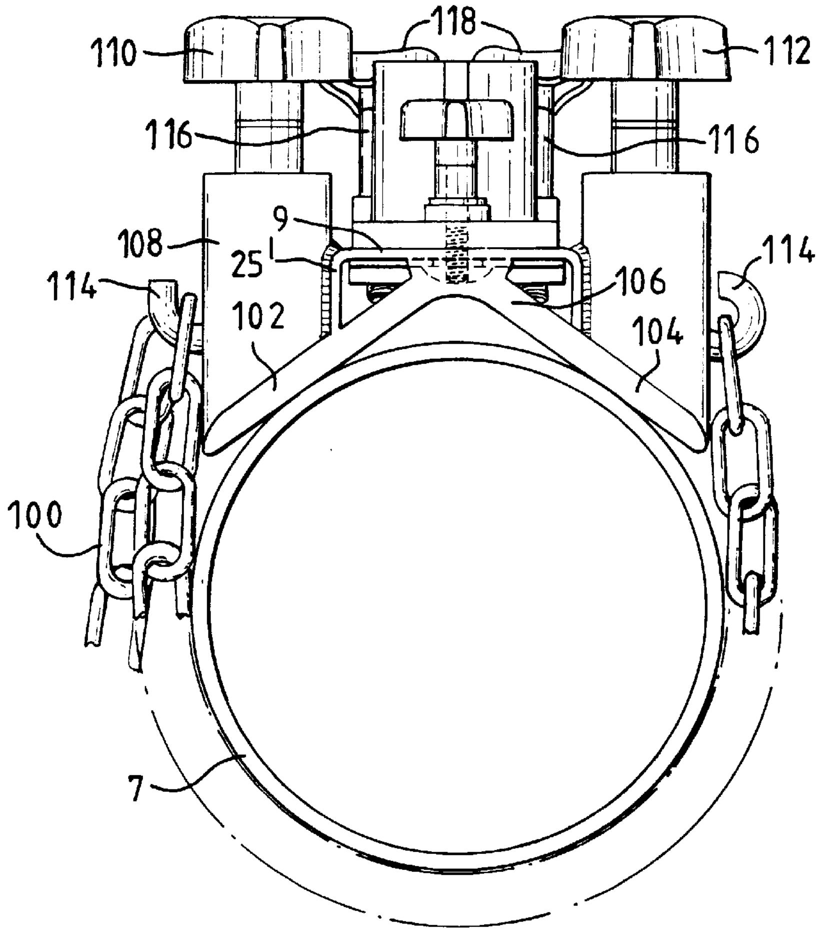
FIG. 6 shows an end view of the apparatus of FIG. 5.
Figure 7:
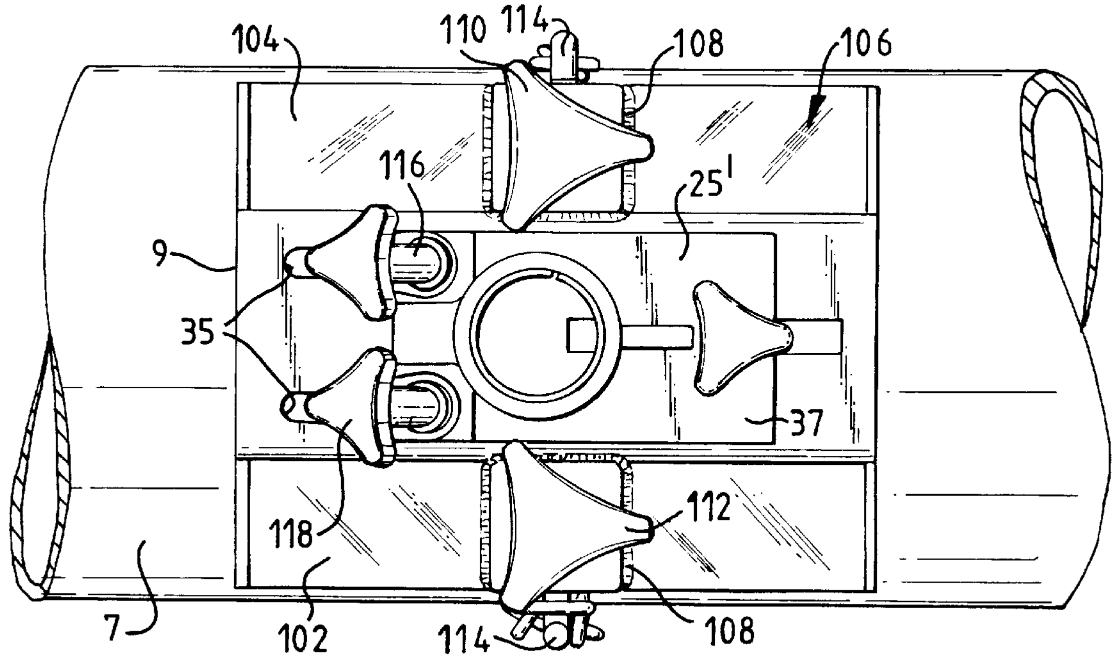
FIG. 7 shows a view from above of the embodiment of FIG. 5 but without the drill and the drill press stand.

Referring now to FIGS. 5,6 and 7, wherein corresponding components are similarly numbered to those above, it can be seen that on an alternative embodiment of the present invention is illustrated.

It can be seen from these figures that the platform 9 no longer couples to a separate backplate. Instead the means for clamping the platform 9 to a pipe 7 to be drilled comprises a member extendible from one portion of the platform to another portion of the platform. In this embodiment the member comprises a chain 100 formed from a plurality of metallic links which extends from one side of the platform 102 to another side of the platform 104. It can be seen that the platform 9 includes a V-shaped flange member 106. In this example, the platform 9 is formed integrally with the V groove 106 although they may be formed as separate members subsequently welded together if desired. Each portion 102 104 of the platform 9 carries a turret 108. Within each turret 108 is housed a screw threaded member which may be rotated manually by rotatable knobs 110, 112. Rotation of the knobs 10 causes the screw thread to rotate and thereby selectively move up or down (as viewing FIG. 6) a detent, in this example a metal hook 114. Each end of the chain 100 may be placed over the end of each hook 114 and thereby the tension in the chain may be adjusted for clamping the pipe 7 by the tension in the chain on either side of the V groove 106 (the portion 102 and portion 104). It will be apparent that only one of the hooks 114 needs to be attached to a screw thread member adjustable by its respective knob 110 or 112. It is advantageous that both turrets 108 include an adjustable screw thread member, but this is not imperative.

When the drilling operation has been finished and it is desired to remove the platform 9 from the pipe 7 then this simply a matter of the user rotating either of the knobs 110, 112 until the tension in the chain 100 has slackened off sufficiently for the chain 100 to be removed from the or each hook 114.

Once again, in common with the previous embodiment, the platform 9 has formed therein a plurality of elongate holes 35. The casting 37 is allowed to travel longitudinally along the holes 35 by way of coach bolts 116 passing through the casting 37 and into the platform 9 in the same manner as with respect to the embodiment of FIGS. 1 to 4. In the embodiment of FIGS. 5 to 7, the coach bolts 116 may be adjustable by rotatable knobs formed on the upper surface thereof, 118. By rotating the knobs 118 the tension placed upon the casting 37 by the coach bolts 116 may be adjusted and in this manner therefore the casting 37 may travel along the elongate holes 35, as has been discussed hereabove.

The drill press stand 47 and associated drill 51 as shown in FIG. 5 are the same as have been shown hereabove with reference to FIG. 4 and so will not be discussed any further herein. Those skilled in the art will appreciate that the method of operation is the same as in the above embodiment.

What is claimed is:

1. An apparatus for mounting a drill press on a pipe having a longitudinal axis, said apparatus comprising:

a platform assembly having a slot extending in parallel to said longitudinal axis when said platform is secured to the pipe, said slot being constructed and arranged to slidably receive the drill press, whereby said drill press is movable along said slot in a direction parallel to the longitudinal axis; and a mechanical clamp disposed about the pipe and attached to said platform to secure said platform to said pipe.

2. The apparatus of claim 1 wherein said platform assembly includes a platform coupled to said mechanical clamp and a frame fixedly secured to said platform, said slot being formed in said frame.

3. The apparatus of claim 1 wherein said mechanical clamp includes a backplate shaped to fit at least partially around the pipe and attaching members that attach said backplate to said platform.

4. The apparatus of claim 1 wherein said platform assembly has a first and a second portion and said mechanical clamp includes a member having a first end attached to said first portion and a second end releasably attached to said second portion, said member being constructed and sized to extend at least partially about the pipe.

5. The apparatus of claim 4 wherein said platform is formed with a surface shaped with a V-shaped groove, said platform being constructed to accept the pipe in said V-shaped groove when mounted on the pipe.

6. The apparatus of claim 4 wherein said platform assembly further comprises a tensioning element arranged to adjusted a tension of said member around the pipe.

7. The apparatus of claim 6 wherein said tensioning member includes a screw-threaded detent.

8. The apparatus of claim 4 wherein said member comprises a chain.

9. The apparatus of claim 1 wherein the drill press includes a pillar and wherein said platform assembly includes a pillar housing arranged to receive said pillar.

10. A drill press combination adapted to drill into a pipe having a longitudinal axis, the combination comprising:

a drill press with a drill;

a platform with a mount supporting said drill press on said platform and having a slot; and a clamp arranged and constructed to secure said platform to the pipe with said drill oriented to make holes in the pipe;

said slot being oriented to allow said drill press to move in a direction parallel to said longitudinal axis when said platform is secured to the pipe.

11. The combination of claim 10 wherein said clamp includes a V-shaped member sized to extend partially about the pipe.

12. The combination of claim 10 wherein said platform has two portions and said clamp includes a chain having a first end attached to one of said portions and a second end attached to the other of said portions.

13. The combination of claim 10 further comprising a tensioning member that tensions said clamp and said platform around the pipe.

* * * * *